US011442654B2

(12) United States Patent
Hsu et al.

(10) Patent No.: US 11,442,654 B2
(45) Date of Patent: Sep. 13, 2022

(54) MANAGING AND RANKING MEMORY RESOURCES

(71) Applicant: Microsoft Technology Licensing, LLC, Redmond, WA (US)

(72) Inventors: Lisa Ru-Feng Hsu, Durham, NC (US); Aninda Manocha, Durham, NC (US); Ishwar Agarwal, Redmond, WA (US); Daniel Sebastian Berger, Seattle, WA (US); Stanko Novakovic, Seattle, WA (US); Janaina Barreiro Gambaro Bueno, Redmond, WA (US); Vishal Soni, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/071,344

(22) Filed: Oct. 15, 2020

(65) Prior Publication Data

US 2022/0121386 A1    Apr. 21, 2022

(51) Int. Cl.
*G06F 3/06*    (2006.01)
(52) U.S. Cl.
CPC .......... *G06F 3/0653* (2013.01); *G06F 3/0608* (2013.01); *G06F 3/0673* (2013.01)
(58) Field of Classification Search
None
See application file for complete search history.

(56) References Cited

U.S. PATENT DOCUMENTS

| 10,037,271 | B1 | 7/2018 | Andersen |
| 10,126,971 | B1 | 11/2018 | Jain et al. |
| 10,346,081 | B2 | 7/2019 | Olson et al. |
| 10,365,854 | B1 * | 7/2019 | Muchherla ............ G06F 3/0608 |

(Continued)

FOREIGN PATENT DOCUMENTS

EP    2802991 B1    5/2020

OTHER PUBLICATIONS

"International Search Report and Written Opinion Issued in PCT Application No. PCT/US21/042131", dated Oct. 15, 2021, 11 Pages.

(Continued)

*Primary Examiner* — Arpan P. Savla
*Assistant Examiner* — Edmund H Kwong
(74) *Attorney, Agent, or Firm* — Ray Quinney & Nebeker P.C; James Bullough

(57) ABSTRACT

The present disclosure relates to systems, methods, and computer-readable media for tracking memory usage data on a memory controller system and providing a mechanism whereby one or multiple accessing agents (e.g., computing nodes, applications, virtual machines) can access memory usage data for a memory resource managed by a memory controller. Indeed, the systems described herein facilitate generation of and access to heatmaps having memory usage data thereon. The systems described herein describe features and functionality related to generating and maintaining the heatmaps as well as providing access to the heatmaps to a variety of accessing agents. This memory tracking and accessing is performed using low processing overhead while providing useful information to accessing agents in connection with memory resources managed by a memory controller.

18 Claims, 6 Drawing Sheets

(56) References Cited

U.S. PATENT DOCUMENTS

| | | | |
|---|---|---|---|
| 10,474,587 B1 | 11/2019 | Visvanathan et al. | |
| 11,210,207 B2 | 12/2021 | Bennett et al. | |
| 2004/0025172 A1* | 2/2004 | Bian | G06F 9/545 |
| | | | 719/328 |
| 2011/0197045 A1* | 8/2011 | Okamoto | G06F 11/3034 |
| | | | 711/166 |
| 2011/0320671 A1* | 12/2011 | Armstrong | G06F 12/1081 |
| | | | 710/306 |
| 2012/0278668 A1 | 11/2012 | Chiu et al. | |
| 2013/0078994 A1 | 3/2013 | Jouin | |
| 2013/0290598 A1* | 10/2013 | Fiske | G06F 3/0625 |
| | | | 711/E12.008 |
| 2014/0095790 A1 | 4/2014 | Chambliss et al. | |
| 2014/0304480 A1* | 10/2014 | Tang | G06F 3/0679 |
| | | | 711/146 |
| 2015/0006787 A1 | 1/2015 | Liu et al. | |
| 2015/0006788 A1 | 1/2015 | Liu et al. | |
| 2015/0106420 A1 | 4/2015 | Warfield et al. | |
| 2015/0106578 A1 | 4/2015 | Warfield et al. | |
| 2016/0011979 A1 | 1/2016 | Islam et al. | |
| 2016/0042005 A1 | 2/2016 | Liu et al. | |
| 2016/0162206 A1 | 6/2016 | Bish et al. | |
| 2017/0060429 A1* | 3/2017 | Gupta | G11C 11/4096 |
| 2017/0301386 A1* | 10/2017 | Parks | G06F 3/064 |
| 2018/0046378 A1 | 2/2018 | Coburn et al. | |
| 2018/0129443 A1 | 5/2018 | Karve et al. | |
| 2018/0136838 A1 | 5/2018 | White et al. | |
| 2018/0260323 A1 | 9/2018 | John et al. | |
| 2019/0138437 A1 | 5/2019 | Bennett et al. | |
| 2019/0171397 A1 | 6/2019 | Patel et al. | |
| 2019/0220217 A1 | 7/2019 | Kimmel et al. | |
| 2019/0243559 A1* | 8/2019 | Raut | G06F 3/0604 |
| 2019/0250819 A1* | 8/2019 | Jain | G06F 3/061 |
| 2019/0324899 A1 | 10/2019 | Kulkarni et al. | |
| 2019/0354412 A1 | 11/2019 | Bivens et al. | |
| 2019/0377676 A1 | 12/2019 | Szczepanik et al. | |
| 2020/0050381 A1 | 2/2020 | Ainscow et al. | |
| 2020/0125503 A1* | 4/2020 | Graniello | G06F 12/0246 |
| 2020/0326871 A1 | 10/2020 | Wu et al. | |
| 2021/0019237 A1 | 1/2021 | Karr et al. | |

OTHER PUBLICATIONS

"Non Final Office Action Issued in U.S. Appl. No. 17/102,084", dated Mar. 24, 2022, 20 Pages.

Wang, et al., "Dynamic Cache Partitioning Based on Hot Page Migration", In Journal of Frontiers of Computer Science, vol. 6, Issue 4, Aug. 6, 2012, pp. 363-372.

Zhu, et al., "Swapx: An NVM-Based Hierarchical Swapping Framework", In Proceedings of IEEE Access, Aug. 9, 2017, pp. 16383-16392.

"International Search Repod & Written Opinion issued in PCT Application No. PCT/US21/057207", dated Feb. 24, 2022, 13 Pages.

* cited by examiner

MANAGING AND RANKING MEMORY RESOURCES

BACKGROUND

Recent years have seen a rise in the use of computing devices (e.g., mobile devices, personal computers, server devices, cloud computing systems) to receive, store, edit, transmit, or otherwise utilize digital data for various processing applications and services. Indeed, it is now common for individuals and businesses to employ the use of computing resources on cloud computing systems. As demand for computing resources continues to grow, there is an interest in innovations that expand available memory capacity. In addition, as demand grows for memory resources, demand for additional information on how memory is being used has also grown.

One limitation in connection with memory systems is a lack of effective memory tracking. For example, conventional systems for tracking memory usage are often expensive to obtain and involve a significant amount of processing overhead. For instance, in order to build a comprehensive history of memory access and modification patterns, a computing device would need to scan usage data with high frequency while expending considerable resources. As a result, many conventional memory systems do not track memory usage.

Another limitation in connection with tracking data generally is that many types of tracking data are cleared when read by an accessing entity. As a result, where multiple entities may attempt to access or benefit from monitored or tracked data, the information obtained may fail to provide useful data. As a result, memory systems are generally limited to a single tenant or device having access to the memory resource, as allowing multiple entities to access memory usage data would limit the effectiveness of the tracked memory usage information.

These and other problems exist in connection with managing and accessing memory systems.

DETAILED DESCRIPTION

Figure 1:
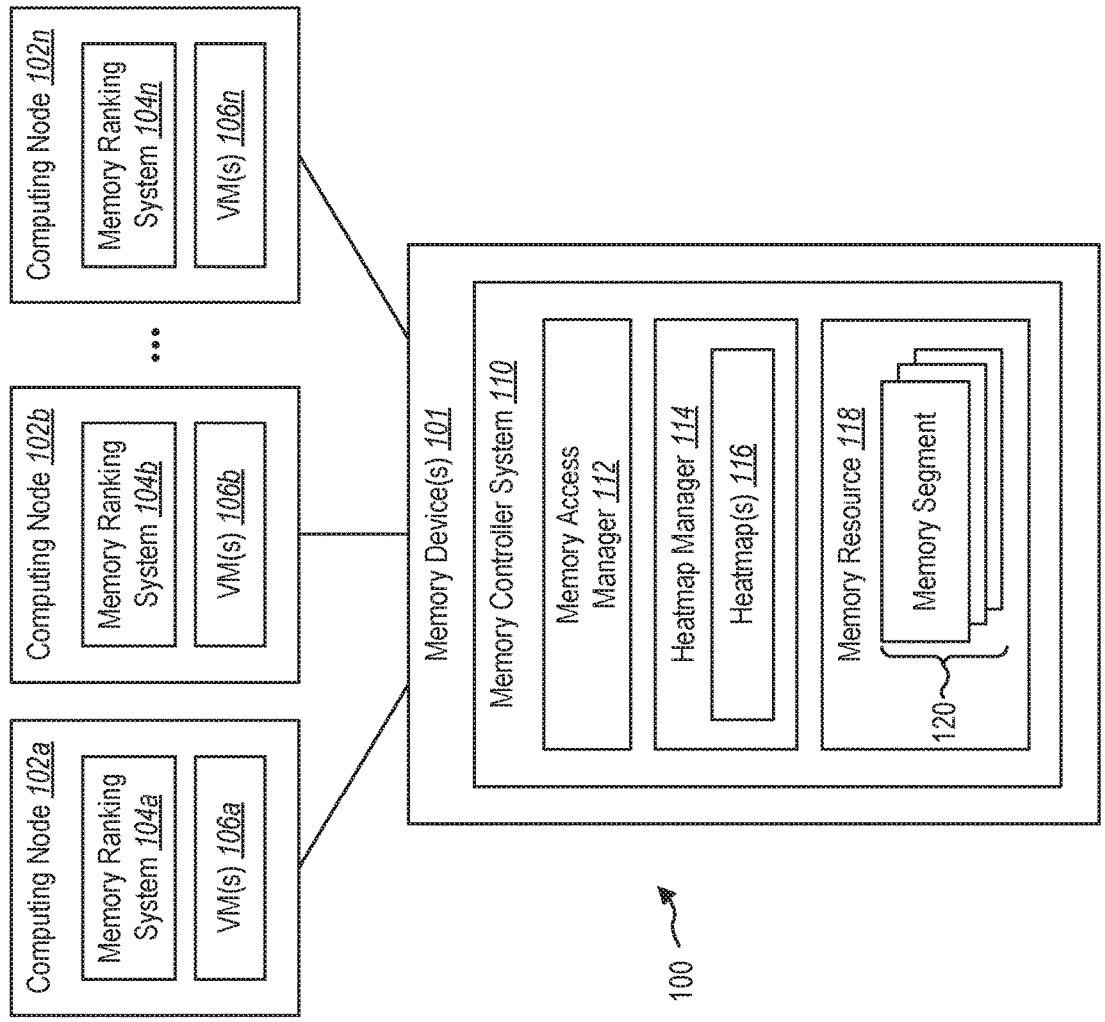
FIG. 1 illustrates an example environment including computing nodes having access to memory usage data on a memory controller system in accordance with one or more embodiments.

The present disclosure is generally related to tracking memory usage data on a memory controller system and providing a mechanism that enables one or multiple accessing agents (e.g., computing nodes, applications, virtual machines) to access the memory usage data. In particular, and as will be discussed in further detail below, one or more memory controller systems on one or more memory devices may generate and manage heatmaps including memory usage data for one or more accessing agents. The memory controller system(s) may facilitate access to the heatmap(s) enabling one or more accessing agents to obtain frequent and low-overhead access to memory usage data without interfering with other accessing agents that similarly have access to memory resources.

By way of example, and as will be discussed in further detail below, this disclosure describes a memory controller system that provides features and functionalities described herein. The memory controller system may include a memory controller that facilitates or otherwise manages access to a memory resource for one or more computing nodes and other accessing agents (e.g., virtual machines, applications). The memory controller system can further track access instances and maintain heatmaps for a collection of memory segments on the memory device. As will be discussed below, the heatmaps may include heatmap entries including a variety of access metrics for memory segments on memory hardware of the memory device. The memory controller system can provide access to heatmaps that are selectively associated with one or multiple computing nodes and other access entities.

The present disclosure includes a number of practical applications that provide benefits and/or solve problems associated with tracking and accessing memory usage data. Examples of these applications and benefits are discussed in further detail below.

For example, while one or more embodiments described herein relate to a memory controller that manages access to a memory resource for a single accessing agent, one or more embodiments described herein involve generating heatmaps for each of a plurality of accessing agents. By generating and maintaining heatmaps for each of multiple accessing agents, the memory controller system can enable any number of devices, virtual machines, or other accessing agents to read memory usage data for respective accessing agents. This can be particularly useful in connection with a pooled memory system that is accessible by multiple devices and/or multiple accessing agents.

The memory controller system may also generate and manage heatmaps that include a wide variety of access metrics. By way of example and not limitation, the memory controller system can generate and maintain heatmap entries for corresponding segments of memory that include access metrics such as access frequency, access recency, access density, access decay, and other useful metrics. Each of these access metrics may be used by a variety of applications and services in a number of ways, which will be discussed in connection with examples herein.

In addition to tracking a variety of useful metrics, the memory controller system can incorporate features and functionality that provide quick and convenient access to the memory usage data without reducing latency in accessing memory resources. For example, and as will be discussed in further detail below, the memory controller system can utilize different access protocols that utilize different access paths (e.g., control paths, data paths, processing paths) in accessing the heatmaps and the memory resources. As another example, and as will be discussed below, the memory controller system can generate and maintain the memory usage data within data objects having a particular size and format that facilitates fast access to the memory usage data while minimizing expense of processing resources.

Furthermore, the memory controller system provides features and functionality that enables tracking of memory usage data across a variety of memory devices having different tracking capabilities. In particular, features and functionality described in connection with one or more embodiments may similarly apply to a variety of memory device-types. This applicability to different memory device-types provides enhanced tracking flexibility when implemented within newer memory systems and/or within existing memory systems. Indeed, features described in connection with memory controller systems described herein may be used in combination with existing memory systems and/or hardware having disparate capabilities to accomplish many of the benefits and advantages described herein.

As illustrated in the foregoing discussion, the present disclosure utilizes a variety of terms to describe features and advantages of the systems herein. Additional detail is now provided regarding the meaning of some example terms.

For example, as used herein, a "computing node," "server node," "host device," or other electronic device may be used interchangeably to refer to any computing device having one or more processing units and capable of implementing an application and/or virtual machine thereon. In one or more embodiments described herein, a computing node may refer to any computing device capable of communicating with and utilizing memory resources (e.g., pooled memory) managed by a corresponding memory controller(s). A computing node may refer to one or more server devices on a network of connected computing devices (e.g., a cloud computing system). Alternatively, a computing node may refer to a mobile or non-mobile computing device, such as a laptop, desktop, phone, tablet, or other device capable of accessing memory resources of one or more memory devices. Additional detail in connection with some general features and functionalities of computing nodes and other computing devices will be discussed below in connection with FIG. 6.

As used herein, "memory resources" or a "memory system" may refer to accessible memory across one or more computing devices. For example, memory resources may refer to a local memory store (or simply "local memory") having blocks of memory that are co-located on a memory device and/or managed by one or more integrated memory controllers on a computing node. Memory resources may also refer to any memory resource that is managed by a memory controller, including local, external, remote, or pooled memory that is accessible to one or multiple computing nodes. Indeed, memory resources may refer to any memory device managed by a memory controller positioned between an accessing agent and memory.

The memory resources may include a variety of memory types. For example, in one or more embodiments described herein, a memory resource may refer to dynamic random access memory (DRAM), static random access memory (SRAM), flash memory, or other non-persistent memory source. In one or more embodiments, the memory system includes dual in-line memory module (DIMM) devices that provide an accessible memory source. In one or more embodiments, the memory system may include multiple memory devices having similar or different types of memory. Further, in one or more embodiments, a local memory has a lower latency speed than a memory resource managed by the memory controller system.

As used herein, a "memory block" may refer to any unit of memory on a memory controller system. For example, a memory block may refer to some quantity of memory that is accessible to one or multiple accessing agents. In one or more embodiments described herein, a memory block includes a plurality of memory segments, which may refer to a portion of a memory block anywhere between a very small portion of memory (e.g., 4 kilobytes (KBs)) to a significantly larger portion of memory (e.g., one gigabyte (GB)). In one or more embodiments, a memory segment refers to any sized block of physical memory. A memory block may include any number of memory segments thereon.

As used herein, "memory usage data" may refer to any information associated with a history of use corresponding to segments of memory. For example, as will be discussed in further detail below, memory usage data may include a variety of access metrics indicating characteristics about a particular memory segment, such as how old a particular segment is, a frequency that the memory segment has been accessed, how recently the memory segment has been accessed, and/or how granular or dense the memory access has been in connection with the memory segment.

As used herein, a "heatmap" may refer to a set of memory usage data associated with one or multiple accessing agents. In one or more embodiments described herein, a heatmap may refer to a table or other data object including memory usage data for a corresponding device, application, virtual machine, or other accessing agent. As will be discussed in further detail below, a heatmap may include entries (e.g., segment entries) having memory usage data associated with respective memory segments of a memory resource. In one or more embodiments described herein, a heatmap refers to a table of values where each row of the table refers to a segment entry. In one or more embodiments, multiple heatmaps are maintained within a heatmap register on the memory controller system.

As used herein, an "accessing agent" may refer to any device and/or software instance having access to a memory resource. For example, in one or more embodiments described herein, an accessing agent refers to a computing node having access to memory resources and a heatmap on a memory controller system. As another example, an accessing agent may refer to a virtual machine, application, or other software/hardware instance having access to memory resources and a heatmap on a memory controller system. In one or more embodiments, a single computing node may have multiple accessing agents implemented thereon. Further, while one or more examples described herein refer specifically to computing nodes acting as accessing agents, features and functionalities discussed in connection with computing nodes accessing and compiling memory usage data from heatmaps may similarly apply to other types of accessing agents, including multiple accessing agents on the same computing node.

Figure 2:
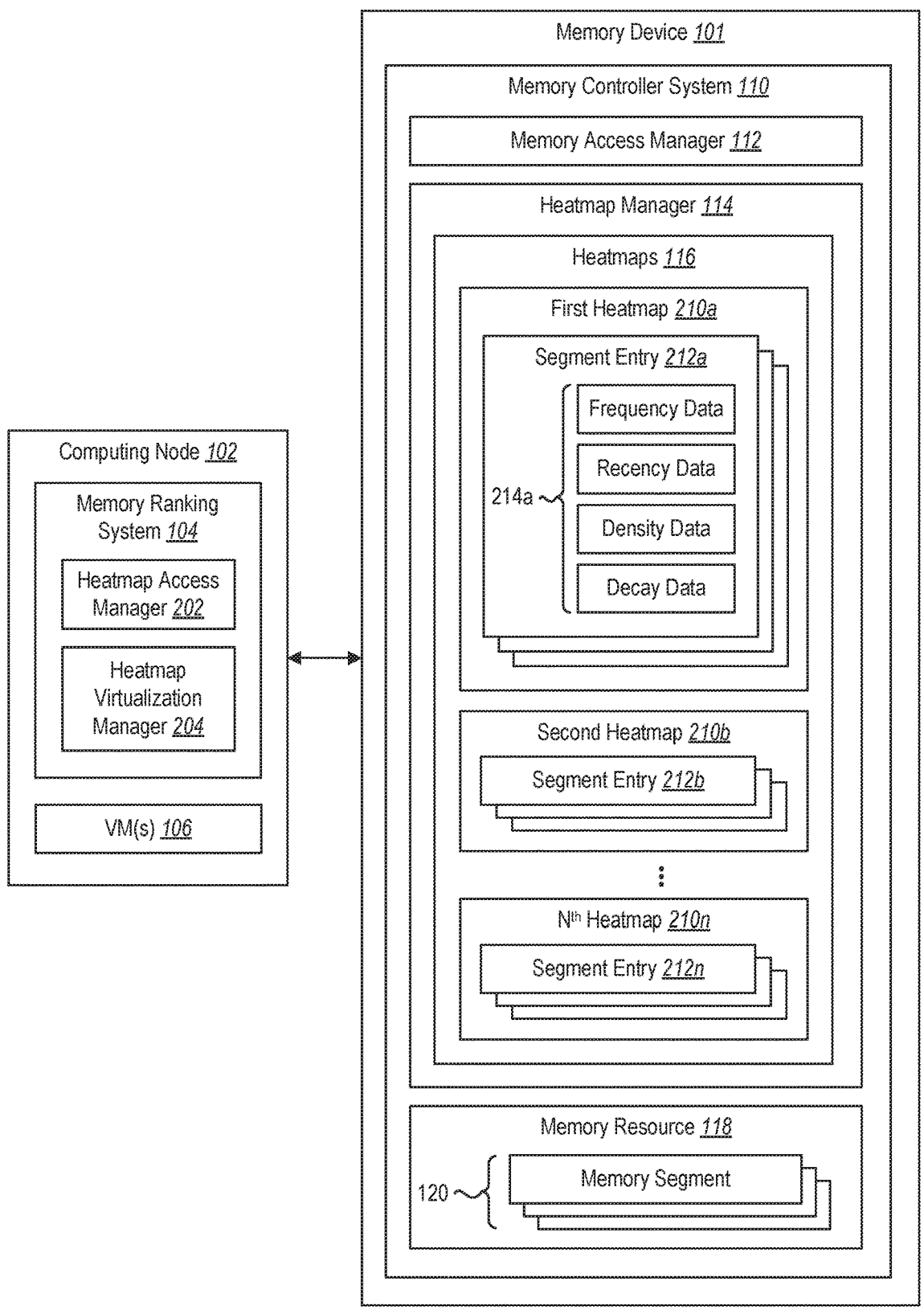
FIG. 2 illustrates an example implementation in which a computing node obtains access to memory usage data on a memory controller system in accordance with one or more embodiments.
Figure 3:
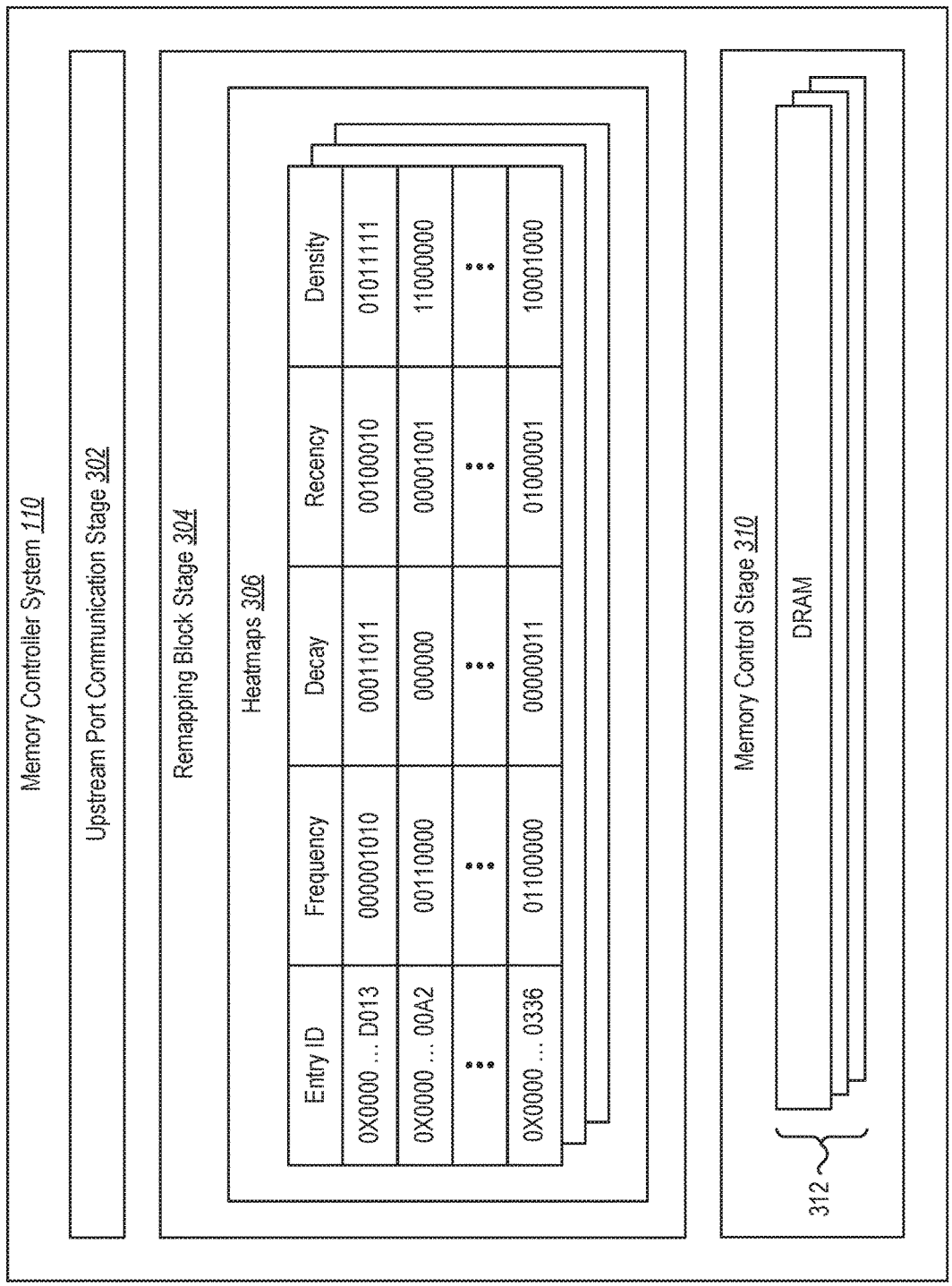
FIG. 3 illustrates an example implementation of a memory controller system in accordance with one or more embodiments.
Figure 4:
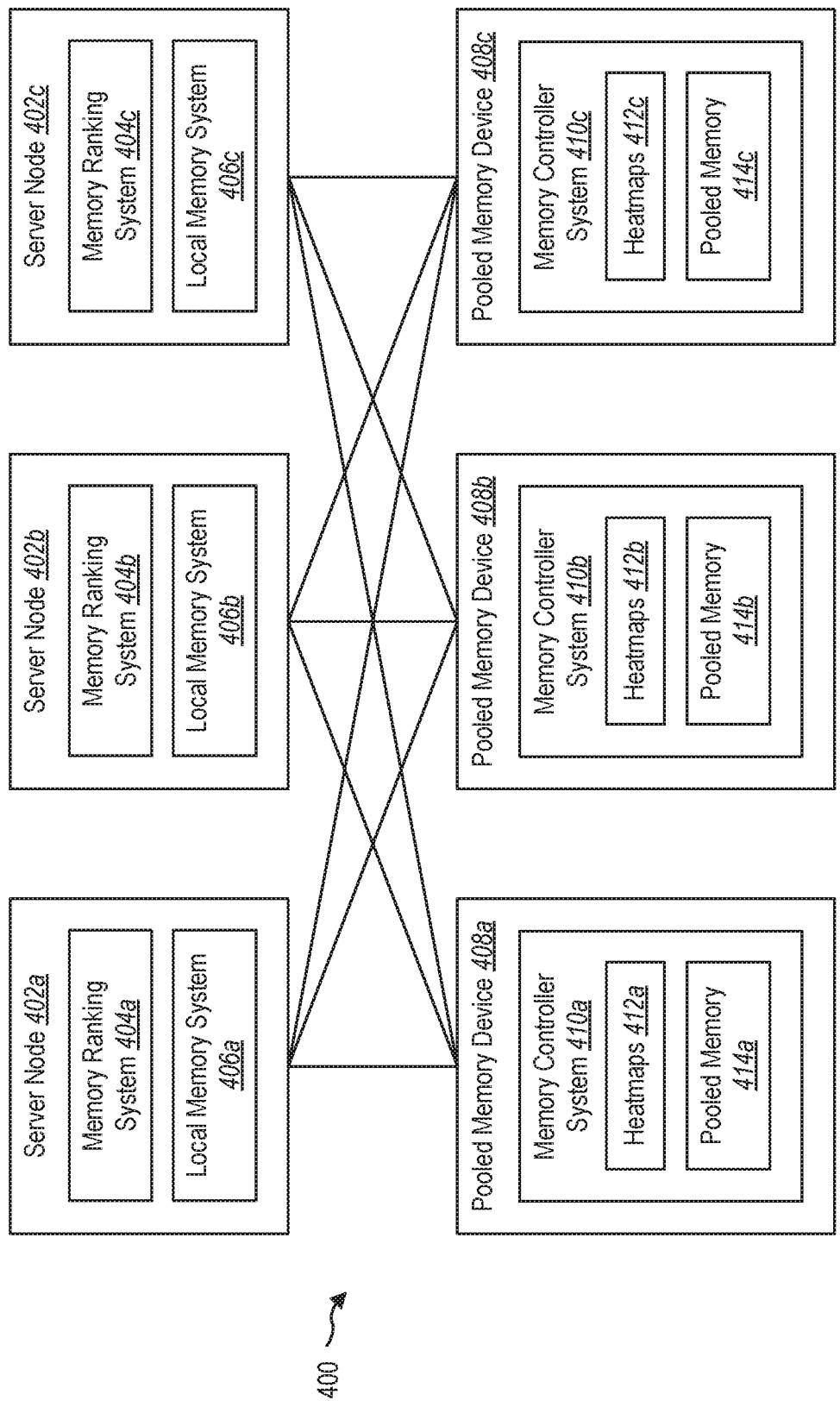
FIG. 4 illustrates another example environment including multiple computing nodes having access to heatmaps across pooled memory devices in accordance with one or more embodiments.

Additional detail will now be provided regarding examples of various systems in relation to illustrative figures portraying example implementations. In particular, FIGS. 1-2 and FIG. 4 illustrate example environments in which a memory controller system may be implemented in accordance with one or more implementations while FIG. 3 illustrates a more detailed implementation of a memory controller system that may be implemented in connection with any of the memory devices shown in the various computing environment.

For ease in explanation, FIG. 1 illustrates an example implementation in which multiple computing nodes have access to a memory resource managed by a memory controller system that tracks memory usage for a memory resource on a memory device(s). FIG. 2 illustrates a more detailed implementation showing a single computing node having access to a memory resource managed by a memory controller system that similarly tracks memory usage for a memory resource on a memory device. FIG. 4 illustrates an example environment in which multiple computing nodes have access to multiple memory resources across multiple memory devices. While these different environments showing different implementations of devices illustrate a variety of features and functionality in connection with managing memory access, tracking memory usage data, and maintaining heatmaps for one or multiple accessing agents, it will be understood that features and functionality of components described in connection with the respective computing nodes and/or memory devices may apply to any of the illustrated implementations. In particular, features described in connection with the more detailed implementation shown in FIG. 2 may apply to either of the implementations described in connection with FIG. 1 and/or FIG. 4.

For example, FIG. 1 illustrates an example environment 100 including a plurality of computing nodes 102a-n and a memory device(s) 101. As shown in FIG. 1, the environment 100 may include any number of computing nodes 102a-n having access to a memory resource 118 on the memory device(s) 101. In addition, while not shown in FIG. 1, the memory device(s) 101 may include multiple memory devices that provide a memory resource to each of the computing nodes 102a-n and accessing agent(s) thereon.

As shown in FIG. 1, the computing nodes 102a-n may include a variety of components thereon. By way of example and not limitation, a first computing node 102a-n may include a memory ranking system 104a and one or more virtual machines 106a. Additional computing nodes 102b-n may include similar components 104-106 thereon. One or more of the computing nodes 102a-n may additionally include local memory thereon, which may have lower latency speeds than the memory resource 118 on the memory device(s) 101. While additional detail will be discussed in connection with the memory ranking system 104a and virtual machine(s) 106a on the first computing node 102a, it will be understood that similar components on the additional computing nodes 102b-n may have similar features and functionality.

As further shown in FIG. 1, memory device(s) 101 may include a memory controller system 110. The memory controller system 110 may include a memory access manager 112, a heatmap manager 114 having heatmap(s) 116 thereon, and an accessible memory resource 118. As further shown, the memory resource 118 may include any number of memory segments 120 including chunks of memory that are accessible to the computing nodes 102a-n.

In one or more embodiments, the memory controller system 110 may refer to a compute express link (CXL) memory controller. The CXL memory controller may include a CXL 2.0 compliant device configured for disaggregated memory usage. As will be discussed in further detail below, one or more embodiments of the memory controller 110 may provide a memory resource for up to eight independent hosts without the need for a CXL switch.

As will be discussed below, the memory ranking system 104a and the memory control system 110 can cooperatively provide features and functionality described herein in connection with providing memory resources to any number of accessing agents (e.g., computing nodes 102a-n, virtual machines 106a-n, applications). In addition, memory ranking system 104a and the memory control system 110 can cooperatively provide features and functionality in connection with generating and maintaining heatmaps, selectively accessing heatmaps for respective accessing agents, and compiling heatmaps over time in accordance with one or more embodiments.

Additional detail in connection with respective components (and sub-components) of the computing nodes 102a-n and the memory device 101 will be discussed in further detail in connection with FIG. 2. In particular, FIG. 2 shows a more detailed example of a computing node 102 and the memory device 101, which may be example implements of similar components included within the environment 100 shown in FIG. 1. For example, the computing node 102 may include similar features as any of the computing nodes 102a-n shown in FIG. 1.

While FIG. 2 illustrates an environment in which the computing node 102 and the memory device 101 are distinct devices, it will be understood that the memory device 101 may be implemented as a subcomponent of the computing node 102 or on a separate device as the computing node 102. Indeed, the memory resource 118 may refer to a local memory resource on the computing node 102, a remote memory resource for the computing node 102, or a pooled memory resource for the computing node 102 and any number of additional accessing agents. Moreover, the memory resource 118 may serve as a primary memory source for the computing node 102 or, alternatively, as a supplemental memory source that augments memory capacity of the computing node 102 having a separate memory source (e.g., a local memory) implemented thereon. Accordingly, features described in connection with FIG. 2 may be applicable to other environments of a memory resource 118 accessible to one or multiple accessing agents managed by a memory controller system 110.

As mentioned above, the memory ranking system 104 and the memory controller system 110 may cooperatively facilitate access to a memory resource 118 on the memory device 101. In particular, the computing node 102 may access the memory resource 118 in a variety of ways. For example, the computing node 102 can read, write, or otherwise access data from a particular memory segment that has been allocated or otherwise associated with the computing node 102 such that the computing node 102 has exclusive access to the memory segment. In one or more embodiments, the virtual machine(s) 106, applications, or other accessing agents can selectively access memory segments 120 on the memory resource 118.

In particular, as mentioned above, the memory controller system 110 may include a memory access manager 112 that manages access to memory segments 120 of the memory resource 118. In one or more embodiments, the memory access manager 112 associates one or more of the memory segments 120 with respective accessing agents. For example, where a memory segment has been allocated for use by the computing node 102, the computing node 102 may have exclusive access to the memory segment. Accordingly, the memory controller system 110 may only provide access to the allocated memory segment to the specific computing node 102. In one or more embodiments, the memory controller system 110 allocates multiple segments (e.g., contiguous or non-contiguous segments) on the memory resource 118 such that the computing node 102 may selectively access those memory segments without accessing other segments from the memory resource 118.

Thus, in one or more embodiments, the memory controller system 110 provides selective access to one or more memory segments from a collection of memory segments 120 on the memory resource 118 of the memory device(s) 101. For example, where eight nodes each have access to the memory resource 118, the memory access manager 112 can provide selective access to eight different subsegments of the memory segments 120 depending on associations of the memory segments with each of the respective computing nodes. In one or more embodiments, the memory controller system 110 controls memory access for each of the computing nodes by maintaining associations between host identifiers (e.g., identifiers of computing nodes or other accessing agents) and corresponding segment addresses. As further shown, in one or more embodiments, the computing node 102 maintains address data or other memory controller data that enables the computing node 102 to provide an indication of a memory segment address (or other identifier of the memory resource 118) in order to access the relevant memory segment(s). Additional detail in connection with managing access to respective memory segments by the computing node 102 will be discussed below in connection with FIG. 3.

As indicated above, in one or more embodiments, the computing node 102 maintains a local memory resource that supplements the memory resource 118 on the memory device 101. In one or more embodiments, the computing node 102 maintains respective portions of data on either the local memory or the memory resource 118 based on a variety of criteria. For example, in one or more embodiments, the computing node 102 maintains critical data or system data within a local memory to ensure reliable access or faster access speeds relative to the data maintained within the memory resource 118. As another example, the computing node 102 may maintain data on either the local memory or the memory resource 118 based on memory usage data collected from the memory device 101. Indeed, the computing node 102 may consider a variety of criteria in determining which portion of data should be maintained between the local or memory resource 118, examples of which will be discussed in further detail herein.

In addition to maintaining data and enabling the computing node 102 to access relevant portions of data, the systems described herein can facilitate tracking interactions (e.g., access instances) with the memory resource 118 and maintaining heatmaps 116 for different portions of memory resources. As used herein, "memory accesses" or "access instances" may refer to any instance in which a computing node, virtual machine, application, or other accessing agent reads, writes, edits, deletes, or otherwise interacts with a memory segment. For example, a single read may refer to a single access instance while a read and a write may refer to two separate access instances. In addition, a stream of access instances may refer to a burst of any number of access instances (e.g., 100s or 1000s of access instances) within a brief period of time.

As mentioned above, the memory controller system 110 can track access instances in a variety of ways. In particular, as mentioned above, and as shown in FIG. 2, the memory controller system 110 can include a heatmap manager 114 that tracks a variety of metrics associated with one or more access instances. In addition, and as will be discussed in further detail below, the memory controller system 110 may track access instances with respect to each of the memory segments 120 on the memory resource 118. Further, where a memory environment (e.g., a pooled memory environment) includes multiple memory devices, each device may include a memory controller system thereon that performs similar features with respect to tracking access instances on memory segments of memory resources thereon.

In one or more embodiments, tracking access instances involves simply detecting that an access instance has happened. For example, in one or more embodiments, the memory controller system 110 maintains a frequency metric (e.g., a frequency count) for each memory segment of the memory resource 118. Upon detecting any access of a memory segment, the memory controller system 110 iterates the frequency counter for the memory segment. In one or more embodiments, the frequency counter includes a saturating counter limited in size based on a number of bits used to represent the frequency metric.

In one or more embodiments, upon identifying or otherwise associating a memory segment with a corresponding accessing agent, the memory controller system 110 can initialize a frequency count to zero. The memory controller system 110 can then increment the frequency count with each detected access. As will be discussed in further detail below, the memory controller system 110 can reset or clear the frequency count in response to reading the associated segment entry. Further, upon evicting or otherwise removing a memory segment from the memory resource 118, the memory controller system 110 can remove the corresponding heatmap from the collection of heatmaps 116. Additional features and functionality in connection with generating and maintaining a frequency metric for corresponding memory segments will be discussed in further detail below in connection with FIG. 3.

In addition to tracking frequency of memory access, the memory controller system 110 can additionally collect or otherwise track additional information in connection with the access instances. For example, the memory controller system 110 can log a time or recency metric associated with an access instance. In one or more embodiments, the memory controller system 110 tracks recency of memory access instances by generating or providing a global access count that tracks a total number of interactions (e.g., access instances) with the memory resource 118. More specifically, the memory controller system 110 can detect any access to any of the memory segments 120 (e.g., by any accessing agent) and iterate a global counter in response to the detected access. The memory controller system 110 can use the global counter to track a most recent access with respect to a given memory segment by copying the global counter value to a segment entry within the heatmap in conjunction with the frequency data.

As an illustrative example, where the memory controller system 110 detects an access instance for a memory segment associated with a first segment entry 212a, the memory controller system 110 can first iterate a frequency counter for the first memory segment 212a to track and maintain the frequency metric. Further, the memory controller system 110 can copy a value from the global counter and store the count alongside the current value of the frequency counter. In this way, the memory controller system 110 can track values reflective of both a frequency with which the corresponding segment is being tracked as well as how recently the memory segment was last accessed. Additional information in connection with tracking frequency and recency data will be discussed below in connection with an illustrative example shown in FIG. 3.

In addition to tracking frequency and recency, the memory controller system 110 can take note or identify a portion of a memory segment that has been interacted with by the computing node 102 (or another accessing agent). For example, as discussed above, the memory segments 120 may differ significantly in size from one another. For instance, one memory segment associated with a corresponding heatmap entry may include only 4 KB of data while another memory segment associated with another heatmap entry may include 2 MB of data. Moreover, it may be possible that only a small portion of the 2 MB memory segment is being accessed while access trends for other portions are relatively static.

In one or more embodiments, the memory controller system 110 facilitates tracking density data indicative of select portions of the memory segment(s) that are being accessed more frequently or recently than others. For example, the memory controller system 110 can generate and maintain density data including values representative of whether specific portions or sub-segments of the respective memory segments are being accessed. In one or more embodiments, the memory controller system 110 maintains a density bit (or other set of values) in which each bit of a multi-bit sequence represents a corresponding portion or subset of data from a memory segment. Further, in one or more embodiments, the memory controller system 110 tracks which portion of a memory segment has been accessed and iterates a corresponding value from the density bit accordingly.

As an example, where a density value includes eight bits representative of eight portions of a corresponding memory segment, the memory controller system 110 can determine which of the eight portions of the memory segment has been accessed and iterate the corresponding bit from the density value to reflect the access instance. Accordingly, where only a single portion of the memory segment is being accessed over and over again, the memory controller system 110 can track density data indicating the select memory segment that is hot (e.g., frequently and/or recently accessed) relative to other portions of the memory segment. Alternatively, where multiple portions of the memory segment are being accessed over and over again, the memory controller system 110 can track this frequency information by causing the density data to reflect this within the segment entry for the heatmap.

In one or more embodiments, the density value(s) differs in length and detail based on a size of a corresponding memory segment. For example, where a first memory segment is significantly smaller in size than a second memory segment, the memory controller system 110 may generate a density value having fewer values representative of the first memory segment than the second memory segment. For instance, a 4 KB memory segment may have fewer associated density bits than a 1 MB or 100 MB memory segment. In one or more embodiments, the size of the density value is a function of how many bits are needed to indicate a memory address or identifier of a memory segment, which would require more bits for memory segments of smaller sizes than memory segments of larger sizes. Indeed, in one or more embodiments, the size of a density bit may range from 8 bits to 20 bits based on a size of the corresponding memory segment. In one or more implementations, the density bit may be one of 8 bits or 16 bits, depending on a configuration of the memory controller system 110. Additional detail in connection with illustrative embodiments is discussed in further detail below in connection with FIG. 3.

As further shown in FIG. 2, the memory controller system 110 can track decay data. The decay data may indicate additional information about a frequency and/or recency of access instances. For example, where a memory segment is particularly hot (e.g., where the memory segment is being accessed with high frequency), a mechanism for tracking the frequency may become saturated. For instance, where a frequency bit only includes eight bits of data, and where a memory segment has been accessed more than 256 times without being cleared, the memory controller system 110 can maintain an additional one or more decay values (e.g., decay bit(s)) to indicate a saturation level of the frequency data. In one or more embodiments, the memory controller system 110 decay data indicating a decay rate or other metric providing an additional metric of frequency with respect to memory segments. Further examples of tracking and maintaining decay data will be discussed below in connection with FIG. 3.

As noted above, and as shown in FIG. 2, the memory controller system 110 can additionally maintain any or all of the tracked information within corresponding segment entries 212*a-n*. In particular, the heatmap manager 114 can maintain tracked memory usage data for each memory segment of the memory resource 118. As noted above, above, the memory usage data can include access metrics including some or all of frequency data, recency data, density data, and decay data with respect to each of the memory segments 120.

As shown in FIG. 2, the memory controller system 110 can maintain a heatmap for each accessing agent. Accordingly, in the example shown in FIG. 2, each of the heatmaps 210*a-n* may include memory usage data for each of multiple computing nodes. In addition, or as an alternative, the memory controller system 110 can maintain a heatmap for each of multiple virtual machines 106 on the computing node 102 (or across multiple computing nodes). Indeed, as shown in FIG. 2, the memory controller system 110 can maintain any number of heatmaps 210*a-n* corresponding to any number of accessing agents having access to the memory resource 118.

As shown in FIG. 2, each of the heatmaps 210*a-n* may include one or more heatmap entries 212*a-n*. In particular, each of the heatmaps 210*a-n* may include heatmap entries 212*a-n* corresponding to respective memory segments 120 of the memory resource 118. Indeed, the memory controller system 110 can maintain a heatmap entry for each memory segment 120 within a corresponding one of the plurality of heatmaps 210*a-n* depending on which node or other accessing agent with which each of the memory segments 120 are associated.

As an illustrative example, FIG. 2 shows a first heatmap 210*a*, which may be associated with the computing node 102. As shown in FIG. 2, the first heatmap 210*a* may include a plurality of segment entries 212*a*. Each of the segment entries 212*a* may include memory usage data for each of the corresponding memory segments from the memory resource 118 with which the computing node 102 is associated. In one or more embodiments, the segment entries 212*a* include memory usage data for any number of memory segments from the memory resource 118 with which the computing node 102 has previously interacted.

As discussed above, and as shown in FIG. 2, each of the segment entries 212*a* may include a variety of different access metrics associated with access instances that have been tracked by the memory controller system 110. In particular, as shown in FIG. 2, the access metrics 214*a* for the first heatmap 212*a* may include various metrics, such as frequency data, recency data, density data, and decay data. These particular metrics 214*a* are provided by way of example, and some or all of the heatmaps may include additional or fewer access metrics, depending on capabilities and/or configurations of the memory controller system 110.

The memory controller system 110 may maintain the heatmap entries in a variety of ways. For example, in one or more embodiments, each of the heatmaps 210a-n are represented by a table having a depth and width corresponding to information contained therein. For example, the heatmaps 210a-n may include heatmap tables in which each row represents a corresponding segment entry and sets of bits or values within the rows are representative of corresponding access metrics. Accordingly, a depth of a heatmap would correspond to a number of rows while a width of the heatmap refers to a number of metrics or bit values representative of the access metrics. Additional information in connection illustrative examples will be discussed below in connection with FIG. 3.

In addition to tracking the access instances and maintaining the heatmaps, the memory controller system 110 can additionally provide access to the heatmaps to the computing node 102 (and other computing nodes in communication with the memory device 101). In particular, the heatmap manager 114 and the heatmap access manager 202 can cooperatively enable access to the memory usage data maintained within the respective heatmaps 210a-n.

In one or more embodiments, the memory ranking system 104 reads one or more of the heatmaps 116 by sending a request to the memory controller system 110. In one or more embodiments, the heatmap access manager 202 reads the memory usage data by performing a memory-mapped input/output (MMIO) read on the memory controller system 110. This enables the heatmap access manager 202 to obtain access to select heatmaps 116, such as a set of segment entries within a heatmap corresponding to the computing node 102. As will be discussed in further detail below, submitting a request by performing an MMIO read enables the computing node 102 to perform a single 8-byte read for each segment entry within a given heatmap.

In one or more embodiments, reading the heatmaps 116 causes all counters and bit values associated with the read to reset to zero. For example, where the memory ranking system 104 performs a read of a first heatmap 210a, each of a plurality of segment entries 212a within the first heatmap 210a may be cleared to zero. Similarly, each of the heatmaps 210a-n may be cleared to zero each time a respective heatmap is read. By clearing the counters and data in this way, the memory controller system 110 can prevent or reduce instances of counters from saturating, thus ensuring that the data contained within the segment entries are useful and relevant. The memory ranking system 104 can facilitate reading the heatmaps 116 at any level of granularity. By way of example, the memory ranking system 104 can read the memory usage data from a relevant heatmap once every second, two seconds, or other predetermined interval.

Upon reading the memory usage data associated with the computing node 102, the memory ranking system 104 can collate or otherwise compile the collected data. In particular, in one or more embodiments, a heatmap virtualization manager 204 can collate the data from a heatmap with previously read memory usage data. For example, upon performing each read, the heatmap virtualization manager 204 can collate the memory usage data and generate a comprehensive representation of the memory usage data over time.

In one or more embodiments, where the memory ranking system 104 performs a read of heatmaps periodically, the heatmap virtualization manager 204 can combine each periodic read with previously read heatmaps. For example, the heatmap virtualization manager 204 can append each subsequent read to generate a log of heatmap reads. In one or more embodiments, the heatmap virtualization manager 204 further processes the memory usage data to generate a representation of heatmap trends or usage data over time with respect to one or more memory segments.

In addition to simply combining memory usage data for a memory resource 118, the heatmap virtualization manager 204 can combine memory usage data for memory across a plurality of memory devices. For example, where the computing node 102 is in communication with and has access to memory resources across a variety of memory devices, the heatmap virtualization manager 204 can further combine the memory usage data to generate a representation of memory hotness across multiple memory devices. Additional features in connection with an example implementation in which multiple computing nodes have access to multiple memory devices is discussed below in connection with FIG. 4.

In one or more embodiments, the heatmap virtualization manager 204 can provide access to the combined memory usage data to various application, virtual machines, or other services hosted by the computing node 102 to accomplish a variety of functions and benefits. By combining the memory usage data in this fashion, the memory ranking system 104 can accurately determine which of a plurality of memory segments are hotter (e.g., more frequency and/or recently used) than other memory segments.

Moreover, by collecting and maintaining a variety of access metrics as discussed above, the memory ranking system 104 can perform a variety of useful functions to facilitate higher performance of the computing node 102. For example, by considering not only frequency of access (e.g., based on a combination of a frequency bit and a density bit), but recency of access and density of access, the memory ranking system 104 can determine a metric of segment hotness or memory hotness to enable the memory ranking system 104 to accurately determine which of the memory segments should be further considered for migration from the memory resource 118 to a local memory having faster access speeds.

In addition to reorganizing chunks of data between local and shared systems, the computing node 102 can utilize the memory usage information to make various decisions. For example, the memory ranking system 104 can consider other memory management functions such as memory replication, memory relocation between memory sources, dividing and/or combining data between memory segments, or other policy or application-based decisions with respect to management of the memory. Moreover, in one or more embodiments, the memory ranking system 104 causes the memory usage data to be shared with different applications, virtual machines, or other services in a variety of ways (e.g., based on unique configurations of the respective applications/services). In each of these examples, collecting additional information beyond a simple metric of whether a memory segment has been read and/or modified provides important information that enables various systems to more efficiently utilize memory resources to improve performance of a computing node and/or applications or services running on the computing node.

Moving on, FIG. 3 provides an example implementation of a memory controller system 110 in accordance with one or more embodiments described herein. As shown in FIG. 3, the memory controller system 110 includes a plurality of stages, each of which may include a combination of hardware and software components to perform features and functionality described herein. In particular, as shown in FIG. 3, the memory controller system 110 may include an upstream port communication stage 302, a remapping block stage 304, and a memory control stage 310. Additional detail will now be given in connection with each of the respective stages of the memory controller system 110.

The upstream port communication stage 302 may include hardware and circuitry components that enable communication between the memory controller system 110 and one or more computing nodes. In one or more embodiments, the upstream port communication stage 302 includes interface logic to a compute express link (CXL) bus. This interface logic may provide a serial interface having a configurable number of lanes for the CXL bus (e.g., four, six, eight lanes). Indeed, the upstream port communication stage 302 may include any number of CXL ports including a plurality of receiver and transmission ports that facilitate communication between the memory controller system 110 and one or more computing devices or other accessing agents. In connection with one or more embodiments described herein, the upstream port communication stage 302 can receive and process transactions (e.g., memory read or write requests) and convert them to a format capable of being sent through hardware of the memory controller system 110.

The remapping block stage 304 can manage access to memory resources as well as access to heatmaps 306 including memory usage data maintained thereon. In connection with managing access to memory resources, the remapping block stage 304 can receive requests relayed by hardware of the upstream port communication stage 302 from any number of hosts (e.g., eight hosts, corresponding to a number of CXL ports). The requests for memory access may include a host identifier (e.g., an identifier of a computing node and/or accessing agent) and a memory address. The remapping block stage 304 can remap the address to a contiguous address block. In short, the remapping block stage 304 can disambiguate requests and map those requests to corresponding segments of memory. In this way, the remapping block stage 304 can provide access to fine-grained chunks of memory to the computing node(s).

As shown in FIG. 3, the memory control stage 310 can host memory devices, which may include any type volatile memory type. In this example, the memory control stage 310 can include double data rate (DDR) bus controllers that enable access to a plurality of DRAM blocks 312. As indicated above, other types of memory hardware may be used in providing memory to computing nodes. As an example, in one or more embodiments, the memory control stage 310 includes controllers and corresponding DIMM devices.

In addition to providing access to memory the memory controller system 110 can provide access to the heatmaps 306. For example, the upstream port communication stage 302 can receive a request to access heatmaps 306 and the remapping block stage 304 can process the request and provide access to select portions (e.g., individual heatmaps, segment entries) of the heatmap 306.

In one or more embodiments, requests for memory access and requests for heatmap access are provided by way of different protocols and are processed on different access paths. For example, in one or more embodiments, a request for memory is provided via a CXL.mem protocol while a request for heatmaps 306 is provided via a CXL.io protocol (or other similar protocol). In addition to utilizing different types of protocols, the respective request types can be processed on different paths. For instance, where the requests for memory access are processed on critical paths or higher performing paths that operate on an order of nanoseconds, the requests for heatmap access can be multiplexed through the remapping block stage 304 and provided as register reads to read content of the heatmaps 306 using a less critical or slower read process.

Further, requests for reading heatmaps 306 may be provided via a non-critical path that is different than an access path of the memory reads. By processing heatmap reads on a different non-critical path from the memory reads, the remapping block stage 304 can provide access to a register containing the heatmaps 306 without detrimentally interfering with memory access speeds on the memory controller system 110. Thus, the remapping block stage 304 can provide access to the heatmaps 306 without incurring a latency penalty on the loads and stores, which are independently going to the DRAM attached to the CXL memory controller via a critical path. Moreover, in one or more embodiments, the loads and stores (e.g., memory reads) are coming from virtual machines or other applications that access the memory resources while the heatmaps 306 are polled by a host operating system on the computing node (or other privileged software entity at a layer below the source of individual access).

In accordance with one or more embodiments described above, the heatmaps 306 may include a variety of different access metrics therein. In the example shown in FIG. 3, the heatmaps 306 illustrates an example set of heatmaps corresponding to associated accessing agents. For example, as shown in FIG. 3, the remapping block stage 304 can maintain a heatmap including a table of access metrics for each of multiple accessing agents.

As shown, the heatmaps may include tables having rows and columns of data. In the illustrative example shown in FIG. 3, a first column may include a list of entry identifiers associated with corresponding memory segments. The second column may include a frequency value for each memory segment. The third column may include a decay value for each memory segment. The fourth column may include a recency value bit for each memory segment. The fifth column may include a density value for each memory segment. Each of these values may refer to bit vectors or bit-sequences of various sizes.

Each of the rows of the tables may refer to an example segment entry in accordance with one or more embodiments described herein. Thus, each row of the table may correspond to a specific memory segment where each memory segment represented within the table is associated with a corresponding computing node (or other accessing agent).

As a first example, a first segment entry includes an entry identifier of "0x0000 . . . D013" referring to an address of a corresponding memory segment. A length of the entry identifier may depend on a size or granularity of the corresponding memory segment. For example, where a memory segment is 4 KB long, a large number of bits (e.g., 40 bits) of data may be needed to accurately identify a location of the memory segment on the memory block(s). Alternatively, where a memory segment is 2 MB, fewer bits (e.g., 28 bits) of data may be needed to identify a location of the memory segment. Accordingly, this entry identifier of the first segment entry may have a corresponding length based on a size of the memory segment.

As further shown, the first segment entry may include eight bits representative of a frequency access metric and eight bits representative of a decay access metric. Other implementations may include fewer or additional bits to represent frequency and/or decay of the memory segment. In accordance with one or more embodiments discussed above, the frequency and decay bits may collectively provide an indication of a frequency with which the memory segment has been accessed between a current time (e.g., a time at which the heatmap is being accessed) and a most recent access of the table. To illustrate, in this first example, the frequency value reads "00000101" indicating (without considering the decay bit) that the memory segment has only been accessed a few times (e.g., five times) since the frequency value last read "00000000." However, because the decay value reads "00011011," it can be determined that the frequency counter has saturated several times, which indicates that the memory segment has been accessed significantly more than five times since the last time that the heatmap for the associated memory segment has been read (causing the segment entry to reset to zero).

As further shown, the first segment entry includes a recency value indicating a time when a most recent access instance occurred. In particular, as discussed above, the remapping block stage 304 may maintain a global counter that increments in response to each memory access of any memory segment by any computing node having access to the memory resource managed by the memory control system 110. While not necessarily a timestamp indicative of a specific date and time of access, this global counter may provide a notion of a timestamp or recency that a memory segment has been accessed relative to when other memory segments have been accessed.

In this example of the first segment entry, the recency value may read "00100010" corresponding to a value of the global counter when the last access instance was tracked and corresponding to when the frequency counter was last incremented. When compared to a current version of the global counter, this value of the recency bit can provide an indication of how recent the memory segment was last accessed. Where the recency value is close to or the same as the global counter, a memory ranking system 104 may determine that the memory segment was recently accessed (e.g., relative to other memory segments on the memory resource).

In one or more embodiments, recency counter values may be modified over time even where a memory segment is not read recently. For example, where a global counter reaches a maximum value (e.g., $2^{64}-1$ where a recency counter has 64 bits), all existing recency counts may be halved or otherwise modified to prevent several different entries from sharing the same recency value. In one or more embodiments, the recency counter is not exposed to the software that accesses the heatmaps 306. Accordingly, the recency counter may not be constrained to a particular size or length similar to the access metrics contained within the heatmap tables.

As further shown in FIG. 3, the first segment entry may include a density bit. In this example, the density value includes eight bits that read "01011111" indicating that six out of eight sub-segments of the corresponding memory segment has been accessed since values of the table were last cleared (e.g., as a result of a heatmap read). In one or more embodiments, each of the bits within the density value represents one-eighth of the memory segment. While this example shows an example density bit having eight bits, other sized density values can have fewer or additional lengths corresponding to different levels of granularity.

For example, in accordance with one or more embodiments described above, the density value may have a length based on a size of the entry identifier. For example, where the entry identifier is longer (e.g., corresponding to a smaller-sized memory segment), the density value may also be shorter than other density values. Alternatively, where the entry identifier is shorter (e.g., corresponding to a larger-sized memory segment), the density value may be longer than other density values to provide additional granularity in how densely the memory segment is being interacted with over time.

In one or more embodiments, the length of the segment entries is 8 bytes (or 64 bits) corresponding to a length of a single MMIO read. Maintaining segment entries at this size enables a computing node to quickly access the heatmaps 306 because each segment entry may be read within a single MMIO read. Accordingly, an entire heatmap can be read using as many MMIO reads as there are rows within the heatmap table. Because MMIO is a serializing operation, which can become expensive, reducing the number of reads needed to obtain information from the heatmaps 306 can provide beneficial results. For example, by maintaining segment entries of this length, the heatmaps 306 can be read more frequently without negatively impacting memory read performance, thus enabling the computing node to gather more comprehensive and more detailed memory usage information.

As indicated above, while the frequency value, decay value, and recency value may have uniform or standard values across each of the segment entries, the density value may vary in length based on a size of the corresponding entry identifier. In one or more embodiments, a combined number of bits that the entry identifier and the density access is forty-eight bits. Accordingly, where a memory segment is 4 KB long and requires forty bits to identify a memory address, the density value may include eight bits. Alternatively, where a memory segment is 2 MB long and requires only twenty-eight bits, the density value may utilize up to twelve additional bits to provide more detailed information about where on a memory segment the memory is being read.

In one or more embodiments, the density value includes some multiple of eight bits. For example, in one or more implementations, the density value includes eight bits when a corresponding memory segment size is between 4 KB and 2 MB. In this example, the density value may include sixteen bits when a corresponding memory segment is between 2 MB and 1 GB. Other thresholds may be used in determining a size of the density value.

In one or more implementations, one or more of the heatmaps are partitioned into n-number of partitions with the number (n) of partitions being associated with software context within one or more computing nodes. For instance, where a heatmap has 512 (or some other number) of entries per computing node, the 512 entries may be partitioned in a variety of ways. As an example, where a computing node has eight virtual machines, applications, or other accessing agents implemented thereon, in order to avoid one virtual machine from polluting access data from another virtual machine, the 512 entries of the heatmap may be partitioned into eight partitions of sixty-four entries where each virtual machine traffic would be tracked using sixty-four entries. Other implementations may have different numbers of partitions and/or different sizes of partitions, for example, in accordance with pre-configured address ranges of a memory controller. Moreover, in one or more implementations, the partitions may be of equal or not equal sizes. For example, one or more virtual machines may be associated with larger or smaller partitions than one or more additional virtual machines.

FIG. 4 illustrates another example implementation of an environment including a plurality of computing devices (e.g., server nodes 402a-c) having access to a plurality of pooled memory devices 408a-c. Each of the server nodes 402a-c may include similar features and functionality as the computing nodes 102a-n discussed above in connection with FIG. 1. Similarly, each of the pooled memory devices 408a-c may have similar features and functionality as the memory device(s) 101 discussed in connection with FIGS. 1-3. In one or more embodiments, the environment 400 refers to a portion of a cloud computing system (or other network of computing devices).

As shown in FIG. 4, the server nodes 402a-c may include memory ranking systems 404a-c and local memory systems 406a-c (e.g., local memories managed by local systems on the server nodes 402a-c). In addition, the pooled memory devices 408a-c may include memory controller systems 410a-c having heatmaps 412a-c and pooled memory 414a-c thereon. Each of the components shown in FIG. 4 may have similar features and functionality as corresponding components discussed above in connection with one or more embodiments.

As shown in this example, each of the server nodes 402a-c may have access to each of the pooled memory devices 408a-c. Thus, in one or more embodiments, the first server node 402a may have access to memory segments across each of the pooled memories 414a-c on the respective memory controller systems 410a-c. Because the first server node 402a has access to memory segments on each of the pooled memory devices 408a-c, each of the memory controller systems 410a-c may maintain memory usage data for the first server node 402a (and/or any of multiple accessing agents on the first server node 402a).

Thus, when reading the heatmaps 412a for the server node 402a, the memory ranking system 404a can collate or otherwise combine memory usage data from different heatmaps on the multiple pooled memory devices 408a-c. In one or more embodiments, the memory ranking system 404a makes determinations of hotness for the different memory usage data based on different combinations of access metrics tracked by each of the memory controller systems 410a-c. It will be appreciated that the additional server nodes 402b-c may similarly collect and collate memory usage data from each of the memory controller systems 410a-c.

While the memory controller systems 410a-c may refer to identical or similar systems having similar or identical functionality as one-another, in one or more embodiments, the memory controller systems 410a-c have one or more differences in capabilities. For example, where a first memory controller system 410a may track each of the above-discussed access metrics (e.g., frequency, decay, recency, density), the second and/or third memory controller systems 410b-c may not have a capability to track one or more of the access metrics. For example, one or more of the memory controller systems may be an older generation device that does not track and maintain recency or density metrics, and thus provide a limited view of memory usage data relative to newer or higher capability versions of the memory controller systems. In this example, the memory ranking systems 404a-c may nonetheless combine the memory usage data from the disparate heatmaps and account for the different available data with respect to certain memory segments.

In addition, it will be noted that, in one or more embodiments, the memory controller systems 410a-c are unaware of one another. Thus, while the server nodes 402a-c may have access to each of the pooled memory 414a-c on the pooled memory devices 408a-c, the pooled memory devices 408a-c may have no communication with one another to compare notions of hotness with respect to various memory segments. Moreover, global recency counters may not necessarily have consistent notions of how frequency or recently access instances across pooled memory devices 408a-c have occurred across the pooled memory devices 408a-c. Accordingly, in one or more embodiments, the memory ranking systems 404a-c can apply one or more models and analyses of the collected memory usage data to determine and compare hotness of memory data between the different pooled memory devices.

In addition, while FIG. 4 illustrates an example environment 400 including three server nodes 402a-c and three pooled memory devices 408a-c, the environment may include additional or fewer devices and associated components. For example, in one or more embodiments, the pooled memory environment includes eight computing nodes in communication with one or more (e.g., eight) pooled memory devices. In this example, the pooled memory devices may be limited based on a number of upstream ports or a CXL bus interface between the memory controller systems and the corresponding computing nodes.

While one or more embodiments described herein describe features of a memory controller system in which a memory controller manages access to a memory resource and facilitates tracking memory usage data thereon, it will be understood that one or more embodiments of the memory controller systems may include multiple memory controller devices that operate independently and independently provide access to corresponding memory resources. This may be applicable, for instance, where a processor includes multiple memory controllers on a machine. The memory ranking system on the computing nodes may then aggregate memory usage data obtained via multiple memory controllers on the respective computing node(s) to provide a view of available memory resources accessible to the computing node(s).

Figure 5:
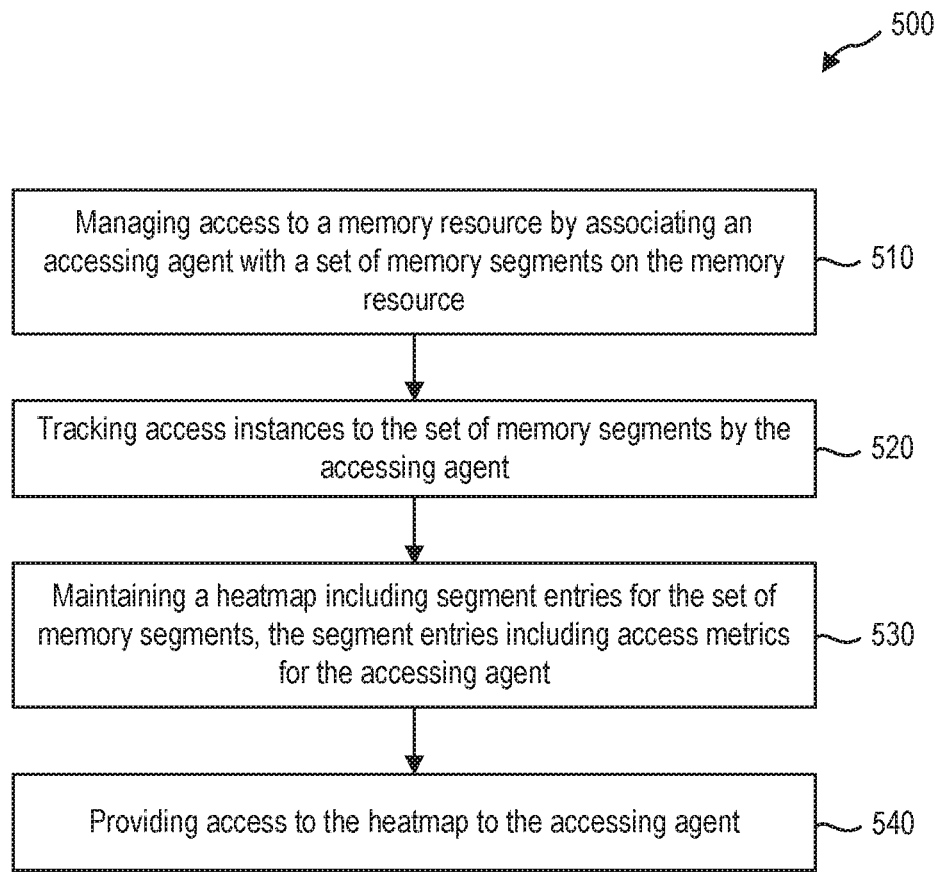
FIG. 5 illustrates an example series of acts for managing and accessing memory usage data for memory resources in accordance with one or more embodiments.

Turning now to FIG. 5, this figure illustrates an example flowchart including a series of acts for tracking access instances to memory resources and maintaining heatmap(s) for one or more accessing agents. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device (e.g., a server device) to perform the acts of FIG. 5. In still further embodiments, a system can perform the acts of FIG. 5.

FIG. 5 illustrates a series of acts 500 related to managing access to a memory resource, tracking memory usage, and providing memory usage data to one or more accessing agents. As shown in FIG. 5, the series of acts 500 may include an act 510 of managing access to a memory resource by associating an accessing agent with a set of memory segments on the memory resource. For example, in one or more implementations, the act 510 may involve managing, by a memory controller, access to a memory resource for one or more accessing agents by associating the one or more accessing agents with corresponding memory segments from a collection of memory segments on the memory resource.

In one or more embodiments, the one or more accessing agents includes a plurality of access agents having access to respective sets of memory segments from the collection of memory segments on the memory resource managed by the memory controller. Further, in one or more embodiments, the memory resource is a shared memory pool and the plurality of accessing agents includes a plurality of computing nodes having access to the collection of memory segments on the shared memory pool. Further, in one or more embodiments, the plurality of accessing agents includes a plurality of virtual machines hosted by one or more computing nodes and having access to respective sets of memory segments from the collection of memory segments on the memory resource.

As further shown in FIG. 5, the series of acts 500 may include an act 520 of tracking access instances to the set of memory segments by the accessing agent. For example, the act 520 may involve tracking, by the memory controller, access instances to the collection of memory segments by the one or more accessing agents.

As further shown in FIG. 5, the series of acts 500 may include an act 530 of maintaining a heatmap including segment entries for the set of memory segments where the segment entries include access metrics for the accessing agent. For example, in one or more implementations, the act 530 may involve maintaining, by the memory controller, one or more heatmaps for the one or more accessing agents where the one or more heatmaps include segment entries having access metrics associated with the one or more accessing agents.

In one or more embodiments, each segment entry from the one or more heatmaps includes a frequency metric for an associated memory segment indicating a count of access instances for the associated memory segment since a last time that the segment entry was accessed. Each segment entry may additionally include a recency metric for the associated memory segment indicating a recency of when the segment entry was last accessed. For example, in one or more implementations, the recency metric indicates a global access count associated with when the segment entry was last accessed where the global access count is associated with a number of access instances for any of a plurality of memory segments on the memory resource by any of the one or more accessing agents.

In one or more embodiments, each segment entry from the one or more heatmaps further includes a density metric for the associated memory segment where the density metric includes a plurality of values associated with multiple portions of the memory segment. Each of the plurality of values may indicate whether a corresponding portion of the memory segment has been accessed since the last time that the segment entry was accessed. In one or more implementations, the density metric includes a density vector including the plurality of values where a size of the density vector is based on a size of the associated memory segment.

In one or more implementations, each segment entry from the one or more heatmaps further includes a decay metric for the associated memory segment where the decay metric indicates a number of times that the count of access instances indicated by the frequency metric has saturated since the last time that the segment entry was accessed.

As further shown in FIG. 5, the series of acts 500 may include an act 540 of providing access to the heatmap to the accessing agent. For example, in one or more implementations, the act 540 may involve providing, by the memory controller, access to the one or more heatmaps to the one or more accessing agents. In one or more embodiments, providing access to the one or more heatmaps includes providing access to a heatmap register on a different access path than an access path that provides access to the memory resource.

In one or more embodiments, the one or more accessing agents includes between two and eight computing nodes. Further, in one or more implementations, the memory controller includes between two and eight compute express link (CXL) ports of an upstream port communication stage configured to receive read requests and map the requests to enable the one or more accessing agents to read the one or more heatmaps.

In one or more embodiments, each segment entry from the one or more heatmaps has eight bytes of data readable by a single memory-mapped input/output (MMIO) read. Moreover, in one or more embodiments, the series of acts 500 includes detecting a read of a heatmap from the one or more accessing agents and, in response to detecting the read of the heatmap, clearing values of access metrics from the heatmap to zero.

In one or more embodiments, the one or more accessing agents includes a plurality of server nodes on a cloud computing system. Further, in one or more implementations, the collection of memory segments includes contiguous memory blocks from dynamic random-access memory (DRAM) devices.

In one or more embodiments, the one or more accessing agents includes a virtual machines. Moreover, in one or more implementations, at least one of the one or more heatmaps is partitioned into a plurality of partitions with the plurality of partitions being associated with respective virtual machines from the plurality of virtual machines.

Figure 6:
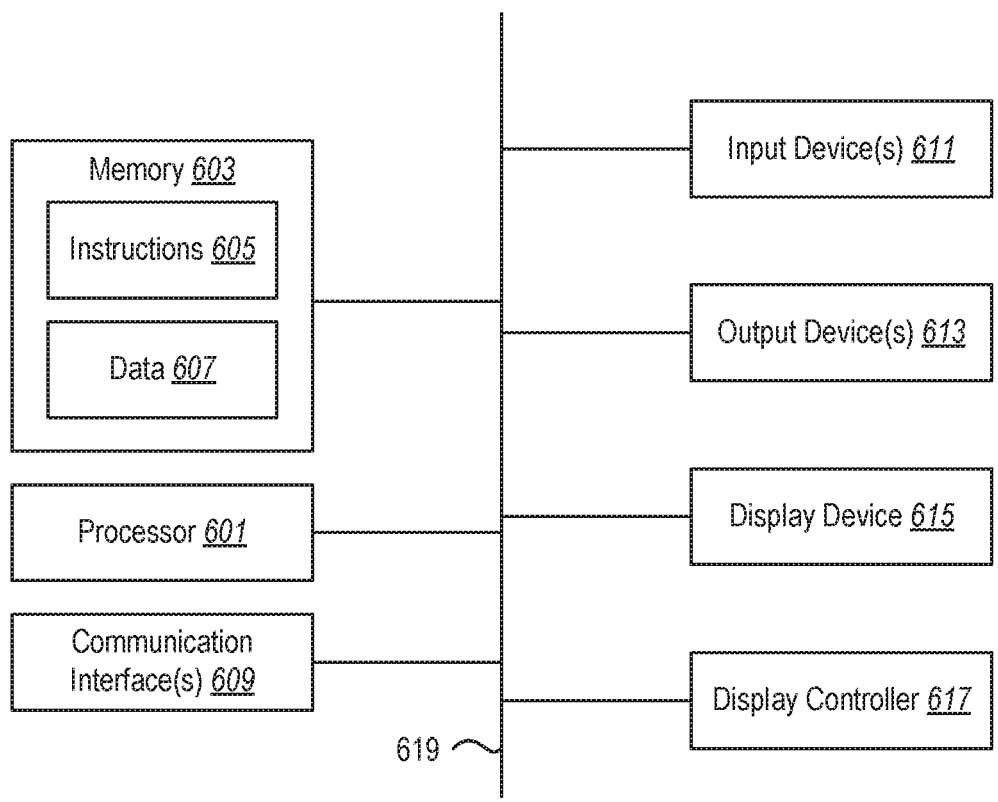
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    managing, by a memory controller, access to a memory resource for one or more accessing agents by associating the one or more accessing agents with corresponding memory segments from a collection of memory segments on the memory resource;
    tracking, by the memory controller, access instances to the collection of memory segments by the one or more accessing agents;
    maintaining, by the memory controller, one or more heatmaps for the one or more accessing agents, the one or more heatmaps including segment entries having access metrics associated with the one or more accessing agents, the access metrics comprising, for each segment entry from the one or more heatmaps:
        a frequency metric for an associated memory segment, the frequency metric indicating a count of access instances for the associated memory segment since a last time that the segment entry was accessed; and
        a recency metric for the associated memory segment, the recency metric indicating a recency of when the segment entry was last accessed; and
    providing, by the memory controller, access to the one or more heatmaps to the one or more accessing agents.

2. The method of claim 1, wherein the one or more accessing agents includes a plurality of access agents having access to respective sets of memory segments from the collection of memory segments on the memory resource managed by the memory controller.

3. The method of claim 2, wherein the memory resource is a shared memory pool, and wherein the plurality of accessing agents includes a plurality of computing nodes having access to the collection of memory segments on the shared memory pool.

4. The method of claim 2, wherein the plurality of accessing agents includes a plurality of virtual machines hosted by one or more computing nodes and having access to respective sets of memory segments from the collection of memory segments on the memory resource.

5. The method of claim 1, wherein the recency metric indicates a global access count associated with when the segment entry was last accessed, the global access count being associated with a number of access instances for any of a plurality of memory segments on the memory resource by any of the one or more accessing agents.

6. The method of claim 1, wherein each segment entry from the one or more heatmaps further includes a density metric for the associated memory segment, the density metric including a plurality of values associated with multiple portions of the memory segment, each of the plurality of values indicating whether a corresponding portion of the memory segment has been accessed since the last time that the segment entry was accessed.

7. The method of claim 6, wherein the density metric comprises a density vector including the plurality of values, and wherein a size of the density vector is based on a size of the associated memory segment.

8. The method of claim 1, wherein each segment entry from the one or more heatmaps further includes a decay metric for the associated memory segment, the decay metric indicating a number of times that the count of access instances indicated by the frequency metric has saturated since the last time that the segment entry was accessed.

9. The method of claim 1, wherein the one or more accessing agents includes between two and eight computing nodes, and wherein the memory controller includes between two and eight compute express link (CXL) ports of an upstream port communication stage configured to receive read requests and map the requests to enable the one or more accessing agents to read the one or more heatmaps.

10. The method of claim 1, wherein providing access to the one or more heatmaps comprises providing access to a heatmap register on a different access path than an access path that provides access to the memory resource.

11. The method of claim 1, wherein each segment entry from the one or more heatmaps has eight bytes of data readable by a single memory-mapped input/output (MMIO) read.

12. The method of claim 1, further comprising:
detecting a read of a heatmap from the one or more accessing agents; and
in response to detecting the read of the heatmap, clearing values of access metrics from the heatmap to zero.

13. The method of claim 1, wherein the one or more accessing agents includes a plurality of server nodes on a cloud computing system, and wherein the collection of memory segments includes contiguous memory blocks from dynamic random-access memory (DRAM) devices.

14. The method of claim 1, wherein the one or more accessing agents includes a plurality of virtual machines, and wherein at least one of the one or more heatmaps is partitioned into a plurality of partitions being associated with respective virtual machines from the plurality of virtual machines.

15. A memory system, comprising:
a memory resource, the memory resource including a collection of memory segments accessible to one or more accessing agents; and
a memory controller being configured to;
manage access to the memory resource for the one or more accessing agents by associating the one or more accessing agents with a corresponding set of memory segments from the collection of memory segments on the memory resource;
track access instances to the collection of memory segments by the one or more accessing agents;
maintain one or more heatmaps for the one or more accessing agents, the one or more heatmaps including segment entries having access metrics associated with the one or more accessing agents, the access metrics comprising, for each segment entry from the one or more heatmaps:
a frequency metric for an associated memory segment, the frequency metric indicating a count of access instances for the associated memory segment since a last time that the segment entry was accessed; and
a recency metric for the associated memory segment, the recency metric indicating a recency of when the segment entry was last accessed; and
provide access to the one or more heatmaps to the one or more accessing agents.

16. The memory system of claim 15, wherein the one or more accessing agents includes one or more of:
a plurality of computing nodes having access to the collection of memory segments;
a plurality of virtual machines hosted by one or more computing nodes and having access to the collection of memory segments; or
a plurality of applications on one or more computing nodes having access to the collection of memory segments.

17. The memory system of claim 15, wherein each segment entry from the one or more heatmaps includes a density metric for the associated memory segment, the density metric including a plurality of values associated with multiple portions of the memory segment, each of the plurality of values indicating whether a corresponding portion of the memory segment has been accessed since the last time the segment entry was accessed.

18. The memory system of claim 15, wherein providing access to the plurality of heatmaps comprises providing access to a heatmap register on a different access path than an access path that provides access to the memory resource.

* * * * *